(12) United States Patent
Cozens

(10) Patent No.: US 9,109,871 B2
(45) Date of Patent: Aug. 18, 2015

(54) VERTICAL LEAP MEASURING DEVICE

(76) Inventor: Mark Randall Cozens, Scottsdale, AZ (US)

( * ) Notice: Subject to any disclaimer, the term of this patent is extended or adjusted under 35 U.S.C. 154(b) by 29 days.

(21) Appl. No.: 13/471,292

(22) Filed: May 14, 2012

(65) Prior Publication Data

US 2012/0285269 A1 Nov. 15, 2012

Related U.S. Application Data

(60) Provisional application No. 61/485,463, filed on May 12, 2011, provisional application No. 61/543,718, filed on Oct. 5, 2011.

(51) Int. Cl.
*A61B 5/00* (2006.01)
*G01B 5/06* (2006.01)

(52) U.S. Cl.
CPC ...................................... *G01B 5/061* (2013.01)

(58) Field of Classification Search
CPC .................... A61B 2562/0219; A61B 5/1038; A61B 5/1123; A61B 5/1116; A61B 5/4528
USPC .......... 73/865.4, 54.32, 54.33, 54.34, 152.34, 73/152.48, 152.49, 186
See application file for complete search history.

(56) References Cited

U.S. PATENT DOCUMENTS

| | | | | |
|---|---|---|---|---|
| 3,795,396 | A * | 3/1974 | Kropelnitski | 482/8 |
| 4,208,050 | A * | 6/1980 | Perrine et al. | 482/148 |
| 5,031,903 | A * | 7/1991 | Clarke | 482/148 |
| 5,072,931 | A * | 12/1991 | Carlson | 482/15 |
| 5,838,638 | A * | 11/1998 | Tipton et al. | 368/10 |
| 6,181,647 | B1 * | 1/2001 | Tipton et al. | 368/10 |
| 7,097,589 | B2 * | 8/2006 | Underwood et al. | 482/15 |
| 7,530,925 | B2 * | 5/2009 | Underwood | 482/15 |
| 2010/0020068 | A1 * | 1/2010 | House | 345/419 |
| 2013/0079906 | A1 * | 3/2013 | Crowley et al. | 700/91 |

* cited by examiner

*Primary Examiner* — Peter Macchiarolo
*Assistant Examiner* — Mohammed Keramet-Amircola
(74) *Attorney, Agent, or Firm* — Schmeiser, Olsen & Watts LLP

(57) ABSTRACT

A vertical leap measuring device is provided. The device comprises rotatable blades mounted to a support mechanism mounted to a mount, which can be mounted to a support structure. The support mechanism is configured to rotate with respect to the mount between an operable position and a stored position. In the operating position, the blades are configured to rotate about the support mechanism in response to user-applied force. Once displaced, the blades can be automatically reset to an original position by operation of a remote-controlled transmitter that commands positioning members to return displaced blades back to their original position. The blades are made of a combination of flexible and non-flexible members.

18 Claims, 10 Drawing Sheets

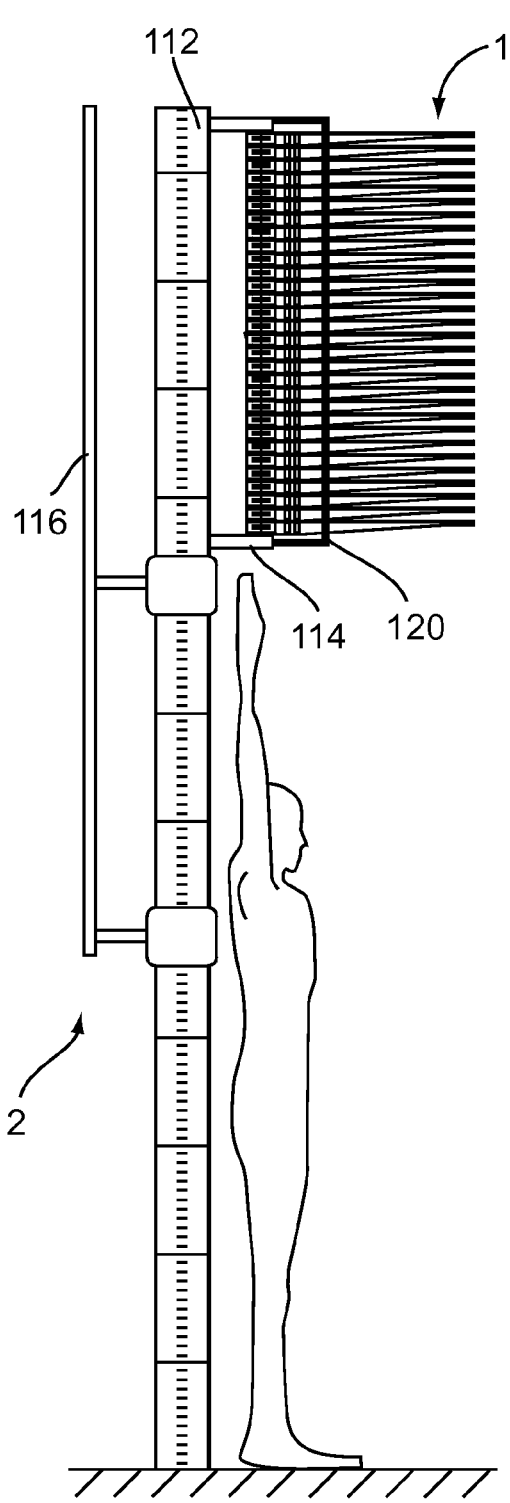
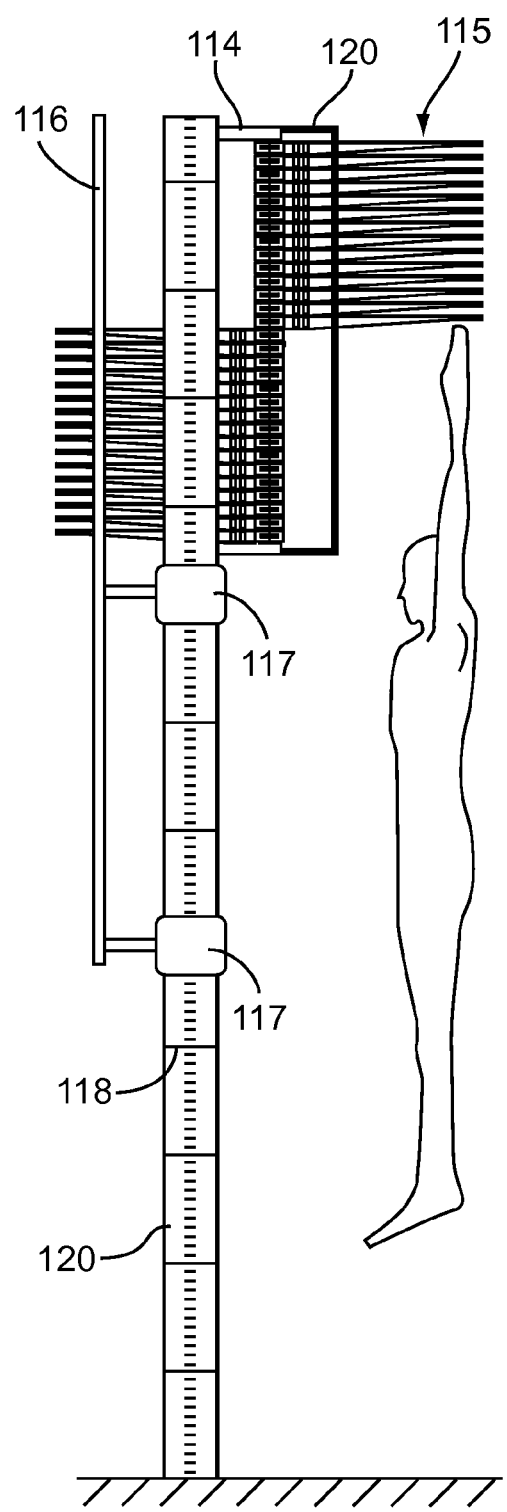
FIG. 11
FIG. 12

VERTICAL LEAP MEASURING DEVICE

CROSS REFERENCE TO RELATED APPLICATION[S]

This application claims priority to U.S. Provisional Patent Application to Cozens entitled "VERTICAL LEAP MEASURING DEVICE," Ser. No. 61/485,463, filed May 12, 2011, and to U.S. Provisional Patent Application to Cozens entitled "VERTICAL LEAP MEASURING POLE," Ser. No. 61/543,718, filed Oct. 5, 2011, the disclosures of which are hereby incorporated entirely herein by reference.

BACKGROUND

1. Technical Field

This disclosure relates generally to a device and method for measuring the vertical leap of an individual.

2. State of the Art

A vertical leap is the act of jumping in the air against gravity to raise oneself off of the ground. In athletics, a vertical leap, or vertical jump, is often referred to as a measure of how high an individual or athlete can elevate off of the ground from a standing position.

To measure one's vertical leap, an individual first reaches into the air with one hand raised high above the head. The height of the hand above the head is the standing reach. This standing reach is measured by marking, or otherwise noting, the height of the tallest fingertip. Thereafter, the individual jumps upwardly, against gravity, from a standing position in an attempt to reach as high as possible. The height of the reach of the tallest fingertip is measured by making, or otherwise noting, the height of the tallest fingertip at the peak of the jump. The difference between the measured heights of the standing reach and the reach attained during the peak of the jump is the individual's vertical leap.

Conventional vertical leap measuring devices often use an apparatus consisting of a plurality of horizontally oriented members that are stacked on top of one another on a vertical-aligned axis and that pivot or rotate about the vertically-aligned axis in response to force. When a user jumps in the air to measure his/her vertical leap, the user contacts and displaces the highest horizontal member that the user can reach with his/her outstretched hand at the peak of his/her jump. The distance between the standing reach of the user and the height of the highest displaced horizontal member is the user's vertical leap.

However, these conventional measuring devices pose complications. These devices are often difficult to move from one location to another. Oftentimes, moving the device requires set-up time and break-down time, which adds to the inconvenience. Some of these measuring devices require counterweights, which are not part of the device itself, to be placed on the device to secure the device to the ground and balance the device while it is in use. Otherwise, the device may displace or fall to the ground upon a user slapping the horizontal members of the device with his/her hand.

In addition to the inconvenience inherent in the set-up, take-down, and securing of the device during its use, operation of the device may also be problematical. Once a user jumps and displaces the horizontal members from their original position, it can be time consuming and burdensome to reset the blades to the original position, where the device is ready to be used by the user or a subsequent user.

There is thus a need for a vertical leap measuring device that addresses the problems described above and offers a convenient and efficient apparatus and method of measuring one's vertical leap.

SUMMARY

The present disclosure relates to a device and method for measuring the vertical leap of an individual.

An aspect of the present disclosure includes a vertical leap measuring device for measuring a vertical leap of a user, the device comprising a mount, a support frame coupled to the mount, a vertical support member, the vertical support member being supported by the support frame, a plurality of blades functionally coupled to the vertical support member, wherein each blade is configured to move with respect to the vertical support member from an initial position in response to a force applied thereto by the user, and a means for resetting the plurality of blades to the initial position, the means for resetting being coupled to the device.

Another aspect of the present disclosure includes the mount being coupled to a structure. Embodiments of the device include the structure being a pole, the pole being anchored in the ground and oriented substantially vertically. Embodiments of the device include the structure being a basketball backboard. Embodiments of the device include the mount being a pole, the pole being anchored in the ground and oriented substantially vertically. Embodiments of the device include the mount being configured to be repeatedly and releasably coupled to the structure.

Another aspect of the present disclosure includes the means for resetting the blades further comprising a reset bar functionally coupled to the pole and configured to rotate about the pole and engage the plurality of blades, and a stop bar functionally coupled to the support frame, the stop bar being configured to engage the reset bar with the blades therebetween, wherein the reset bar and the support frame are configured to slidably engage the pole such that the reset bar and the support frame releasably couple to the pole at heights determined by the user, and wherein the pole further comprises a measurement grid thereon.

Another aspect of the present disclosure includes the means for resetting the blades further comprising positioning members coupled to the support frame and configured to pivot about an axis to engage the plurality of blades, wherein the positioning members pinch the blades therebetween to reset each of the blades to the initial position.

Another aspect of the present disclosure includes the positioning members pivoting in response to an electric signal. Another aspect of the present disclosure includes the positioning members pivoting in response to user input.

Another aspect of the present disclosure includes the vertical leap measuring device comprising a support frame, a vertical support member, the vertical support member being supported by the support frame, a plurality of blades functionally coupled to the vertical support member, wherein each blade is configured to pivot about the vertical support member from an initial position in response to a force applied thereto by the user, and a means for resetting the plurality of blades to the initial position, the means for resetting being coupled to the device, wherein each blade further comprises a grommet and a body, wherein the grommet is configured to functionally engage the vertical support member and the body is configured to repeatedly and releasably couple to the grommet, the body extending from the grommet and being oriented substantially orthogonally with respect to the vertical support member, the body being configured to be contacted by the force applied by the user.

Another aspect of the present disclosure includes a friction reducing member positioned between the vertical support member and the grommet, the friction reducing member being configured to rotatably engage the vertical support member.

Another aspect of the present disclosure includes a spacer positioned on the vertical support member between neighboring blades and configured to slidably engage the vertical support member.

Another aspect of the present disclosure includes the grommet being malleable such that under the condition that force is applied to the body, the blade flexes in a horizontal or a vertical direction, in addition to pivoting about the vertical support member.

Another aspect of the present disclosure includes the grommet being rubber and the body being aluminum.

Another aspect of the present disclosure includes the vertical leap measuring device comprising a mount, a support frame coupled to the mount, a vertical support member, the vertical support member being supported by the support frame, a plurality of blades functionally coupled to the vertical support member, wherein each blade is configured to pivot about the vertical support member from an initial position in response to a force applied thereto by the user, and a means for resetting the plurality of blades to the initial position, the means for resetting being coupled to the device.

Another aspect of the present disclosure includes the support frame being configured to rotate with respect to the mount between a stored position and an operable position.

Another aspect of the present disclosure includes the mount being configured to be repeatedly and releasably coupled to a basketball backboard, and wherein in the stored position the blades are directed away from a back face of the backboard and in the operable position the blades are directed away from one of a side of the backboard and a front face of the backboard.

Another aspect of the present disclosure includes the mount being configured to be repeatedly and releasably coupled to a structure, and wherein the support frame is configured to slidably engage the mount.

Another aspect of the present disclosure includes the support frame rotating with respect to the mount in response to an electric signal.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members:

FIG. 11 is a front view of an embodiment of the measuring device in accordance with the present disclosure.

FIG. 12 is a front view of an embodiment of the measuring device in accordance with the present disclosure.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
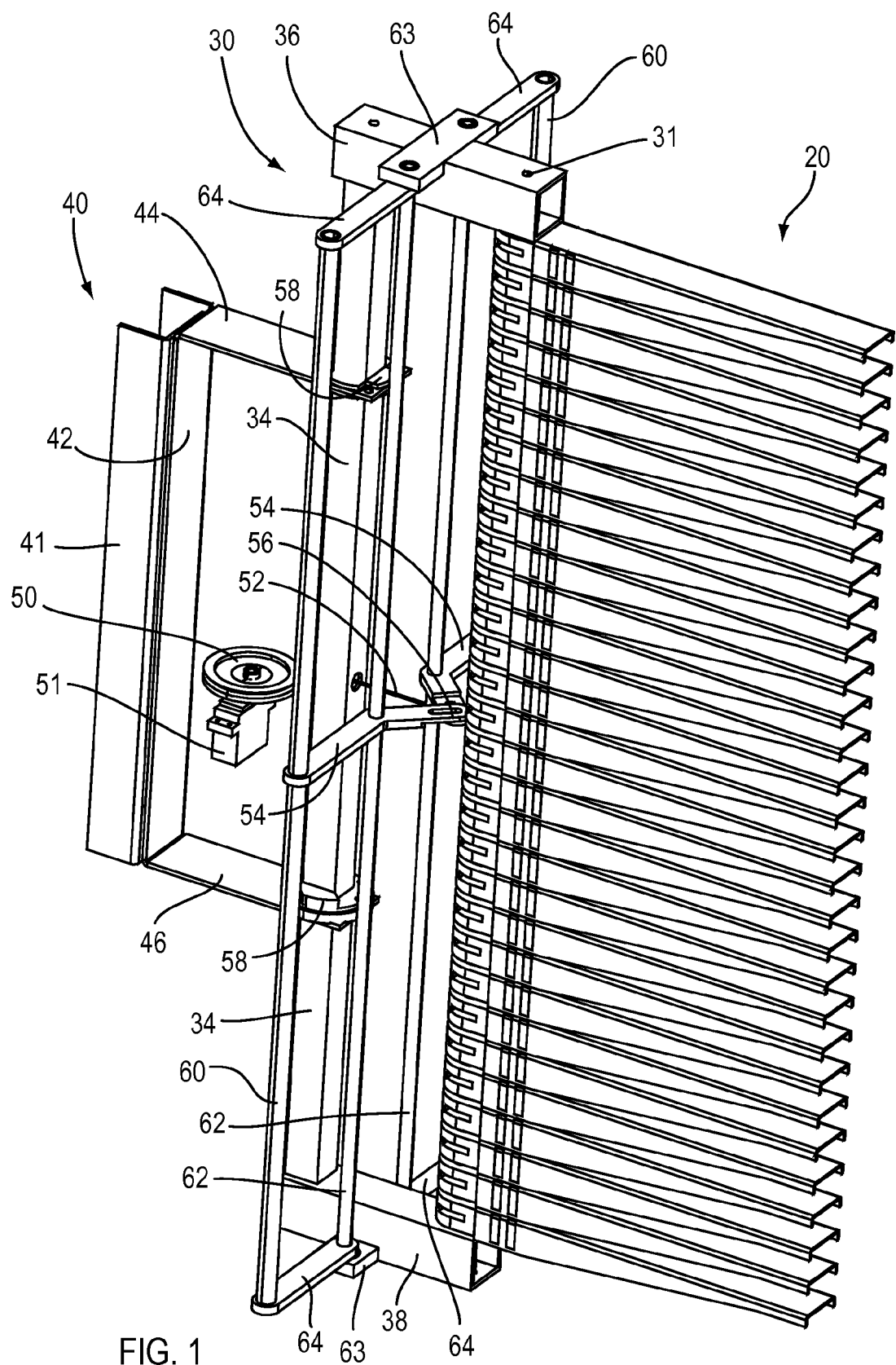
FIG. 1 is a right-side perspective view of an embodiment of the measuring device in accordance with the present disclosure.
Figure 2:
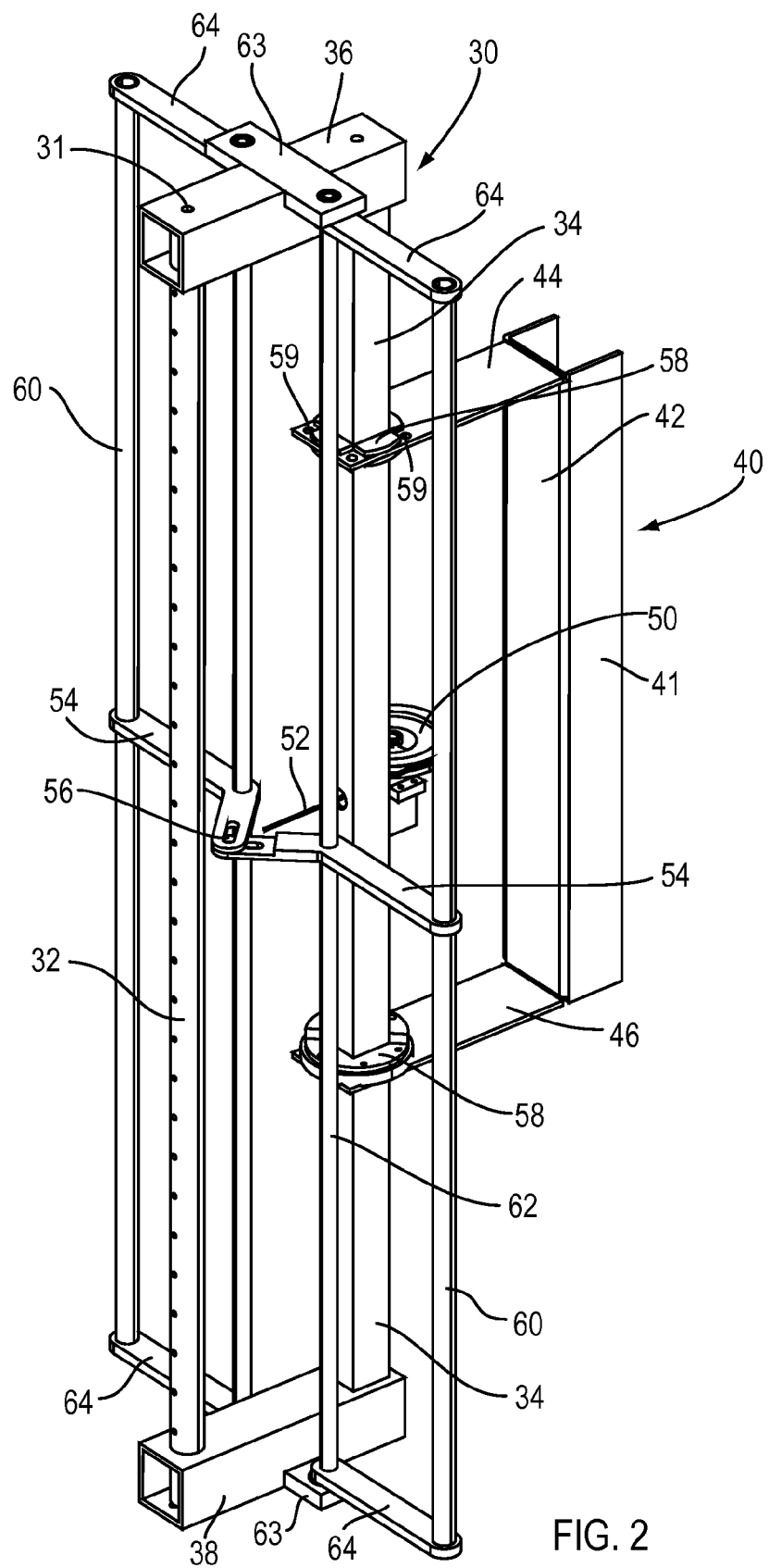
FIG. 2 is a left-side perspective view of the measuring device in accordance with the present disclosure.
Figure 3:
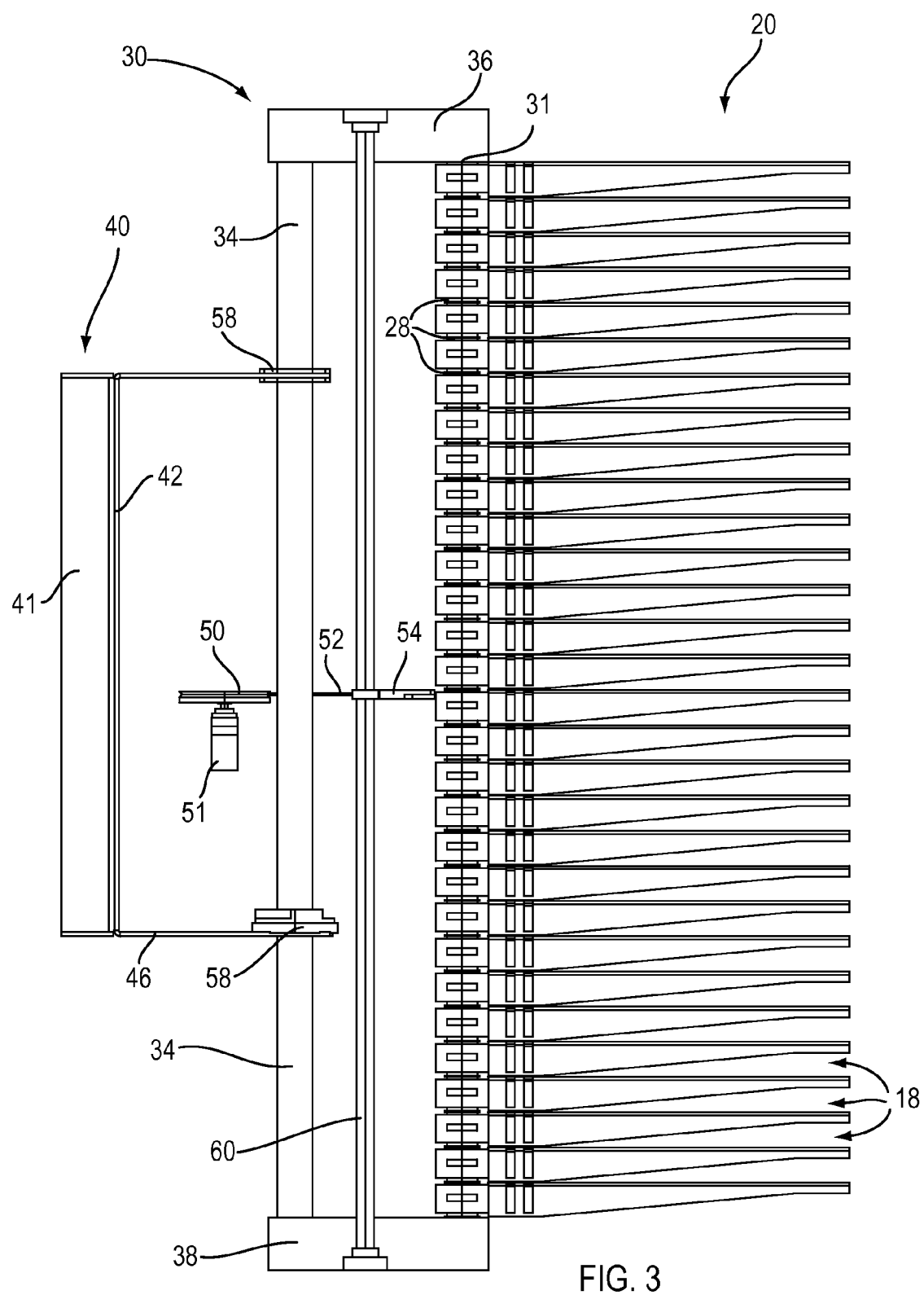
FIG. 3 is a right-side view of the measuring device in accordance with the present disclosure.
Figure 13:
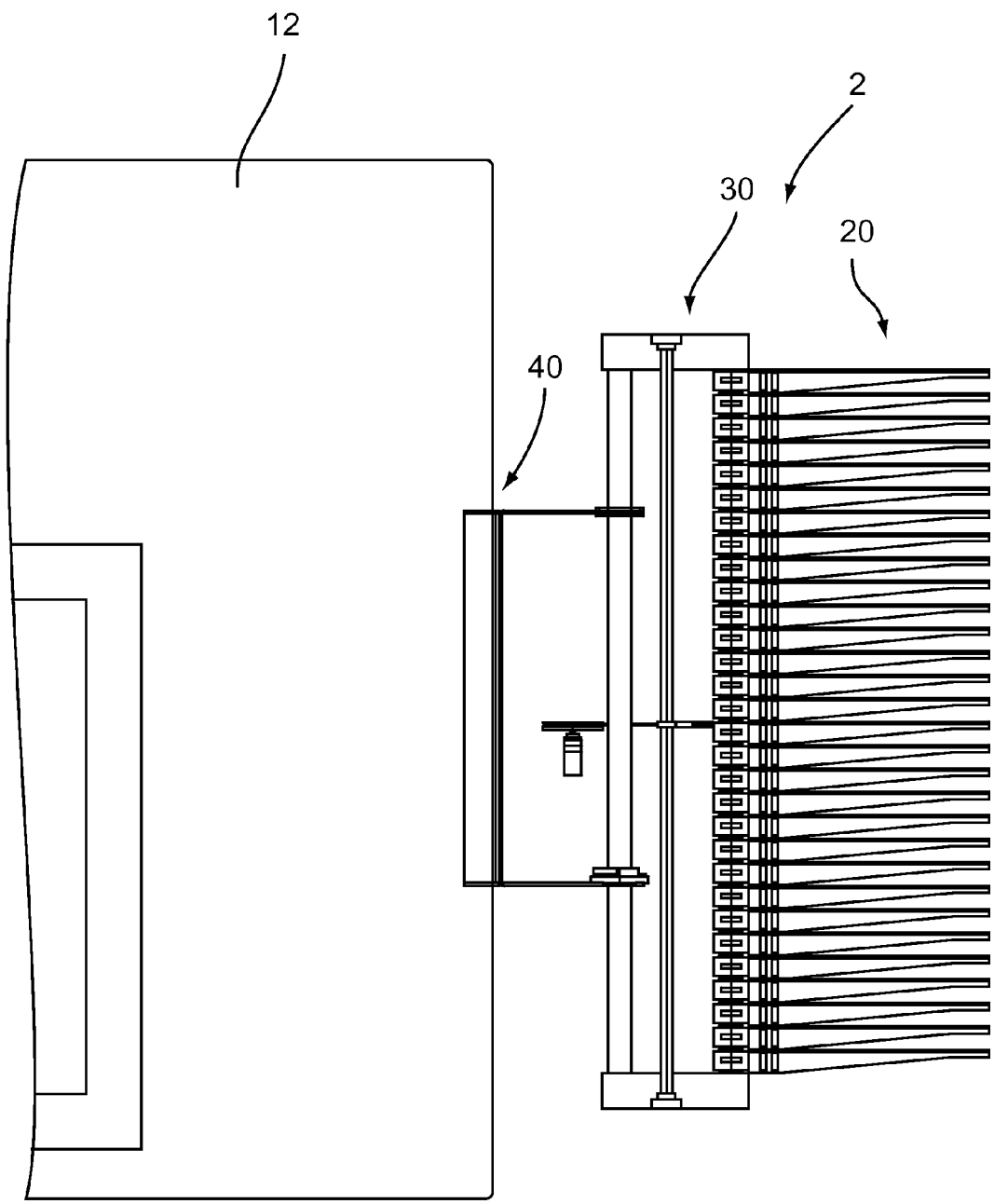
FIG. 13 is a perspective view of the measuring device of the present invention coupled to a conventional basketball backboard.

Referring to the drawings, FIGS. 1-3 depict a vertical leap measuring device 2 comprising displaceable blades 20 that are functionally mounted to a support mechanism 30 that is functionally coupled to a mount 40 that may be functionally coupled to a support structure 10, which may include a conventional basketball backboard 12, as depicted in FIG. 13. Indeed, the device 2 may be coupled to the side edge or near the side edge of the basketball backboard 12, as depicted. Means for coupling the device 2 to the support structure 10 may include allen screws releasably secured to side portions of a securing member 41 of the mount 40 that may be operated to secure the securing member 41 to the support structure 10. Further, the means for coupling the device 2 to the support structure 10 may include means for coupling two components to one another or means for securing one component to another that are now know or later developed by those of ordinary skill in the art.

Embodiments of the device 2 may include the mount 40 further comprising a securing member 41, back brace 42, a top brace 44, and a bottom brace 46. The securing member 41 may be directly coupled to the back brace 42. The securing member 41 may extend along the length of the back brace 42.

The securing member 41 may be fixedly coupled to the back brace 42, such that neither the securing member 41 nor the back brace 42 move with respect to one another once the securing member 41 has been coupled to the support structure 10.

Embodiments of the mount 40 may alternatively include the securing member 41 being removably and releasably coupled to the back brace 42. Embodiments of the mount 40 may further include the back brace 42 being moveable, or otherwise displaceable from the securing member 41, such that the back brace 42 may be moveable with respect to the securing member 41, especially under the condition that the securing member 41 is coupled to the support structure 10. Specifically, the back brace 42 may be configured to slide along the length of the securing member 41 to either lower or raise the back brace 42 with respect to the securing member 41 and thus with respect to the support structure 10. For example, the back brace 42 may be configured with notches or points that engage corresponding coupling components on the securing member 41 to facilitate the transition or movement of the back brace 42 along the securing member 41 and the subsequent re-securing of the back brace 41 to the securing member 41 after it has been moved, as described above. Further in example, one or both of the back brace 42 and the securing member 41 may be configured with rails that communicate with one another and facilitate movement of the back brace 42 with respect to the securing member 41.

The top brace 44 of the mount 40 may be coupled to the top of the back brace 42 and the bottom brace 46 of the mount 40 may be coupled to the bottom of the back brace 42. The top brace 44 and the bottom brace 46 may extend orthogonally from the back brace 42 away from the securing member 41. Each of the top brace 44 and the bottom brace 46 may have incorporated therein, or otherwise coupled thereto, a coupler 58 for facilitating the rotational movement of the support frame 30 with respect to the mount 40, as will be described in greater detail herein. The securing member 41, the back brace 42, the top brace 44, and the bottom brace 46 may be made of strong material, such as metals and plastic polymers that can withstand both outdoor and indoor weather conditions. By way of example, and not limiting in any way, stainless steel and aluminum may be utilized to manufacture components of the mount 40. Embodiments of the mount 40 include the securing member 41, the back brace 42, the top brace 44, and the bottom brace 46 being formed of a single integral component. Alternatively, embodiments of the mount 40 include the securing member 41, the back brace 42, the top brace 44, and the bottom brace 46 being formed of individual components and thereafter being coupled to one another.

Embodiments of the device 2 include the support frame 30 further comprising a blade support element 32, a vertical support member 34, a top horizontal member 36, and a bottom horizontal member 38. The vertical support member 34 may be functionally coupled to the mount 40, as will be described in greater detail herein, such that the support frame 30 is functionally and operationally supported by the mount 40. At respective distal end of the vertical support member 34, the top horizontal member 36 and the bottom horizontal member 38 may be coupled thereto, respectively. The top horizontal member 36 and the bottom horizontal member 38 may be fixedly coupled to the vertical support member 34. Indeed, embodiments of the support frame 30 include the vertical support member 34, the top horizontal member 36, and the bottom horizontal member 38 being formed of a single integral component. Alternatively, embodiments of the support frame 30 include the vertical support member 34, the top horizontal member 36, and the bottom horizontal member 38 being formed of individual components and thereafter coupled to one another.

Embodiments of the support member 30 further comprise the blade support element 32 being configured to be able to releasably and repeatedly couple between the top horizontal member 36 and the bottom horizontal member 38. In alternative embodiments of the support member 30, the blade support element 32 may be fixedly coupled between the top horizontal member 36 and the bottom horizontal member 38. In either configuration, the blade support member 32 may be configured to be a rod or other similar cylindrical shape, about which the blades 20 may rotate. The blade support member 32 may thus comprise an axis of rotation 31 about which the plurality of blades 20 rotate, or otherwise displace.

As described briefly above, the support frame 30 may be functionally coupled to the mount 40 by way of one or more couplers 58. The coupler 58 may be made of strong material, such as metals and plastic polymers that can withstand both outdoor and indoor weather conditions. The coupler 58 may be coupled to each of the top brace 44 and the bottom brace 46. Each of the couplers 58 may be configured to rotate with respect to the top brace 44 and bottom brace 46, respectively. The coupler 58 may be configured to receive a vertical support member 34 of the support frame 30. For example, the coupler 58 may have a through bore therein that corresponds to the cross-section of the vertical support member 34. As depicted, the vertical support member 34 has a square cross section. Other cross-sections may be utilized, such as a circle, rectangle, or other geometric shapes. By way of the through bore, the coupler 58 may functionally engage therein the vertical support member 34. Thus, by the coupler 58 being configured to rotate, or otherwise spin, with respect to the top and bottom braces 44 and 46, respectively, and the coupler 58 being functionally coupled to the vertical support member 34, the vertical support member 34 is thereby configured to rotate, or otherwise spin, with respect to the mount 40 by way of the coupler 58.

The top brace 44 and bottom brace 46 may have integrated therein holes 59 that are configured to receive locking pins 57 (not shown) that are configured on the vertical support member 34. The locking pins 57 and the holes 59 may be configured to correspond to one another and to functionally engage one another. Thus, under the condition that the locking pins 57 are inserted into the holes 59, the support frame 30 can be effectively locked in place with respect to the mount 40, until the locking pins 57 are disengaged from the holes 59, whereupon, the support frame 30 is free to rotate with respect to the mount 40 up until the a time where the locking pins 47 are once again engaged within the holes 59. The holes 59 and the locking pins 47 may be configured on the top brace 44 and bottom brace 46 to allow the support frame 30 to rotate at least through 180 degrees with respect to the mount 40. In that regard, a plurality of holes 59 may be provided at regular intervals along the rotational path of the support frame 30, such that the support frame 30 may be effectively locked to the mount 40 at regular intervals through the activation of the locking pins 47 in the desired holes 49, as chosen by the user.

At a position along the length of both the top horizontal member 36 and the bottom horizontal member 38, plates 63 may be coupled thereto, respectively. A pivot bar 62 may be coupled between the plate 63 positioned on the top horizontal support member 36 and the plate 63 positioned on the bottom horizontal support member 38. A pivot bar 62 may be positioned between plates 63 on either side of the plates 63, or in other words on either side of the top horizontal support member 36 and the bottom horizontal support member 38. Thus, at least two pivot bars 62 run between the plates 63, one on either side of the support members 36 and 38. Coupled to the pivot bars 62 near opposing ends of the pivot bars 62, an arm 64 may extend orthogonally from the pivot bars 62. Coupled to each of the opposing ends of the arms 64 may be a positioning member 60. Thus, a positioning member 60 may configured between each pair of arms 64, and each positioning member 60 may be functionally coupled to its corresponding pivot bar 62 by way of the respective arms 64.

Embodiments of the support frame 30 further comprise a pulley 50, a cable 52, and actuating members 54. The pulley 50 may be coupled to a pulley mount 51. The pulley mount 51, although depicted in the Figures as not being coupled to another component of the device 2, is actually necessarily coupled to the support frame 30 at a feasible location to provide stability and tension to the cable 52. The actuating members 54 may be configured to functionally couple to one another at actuating joint 56. A pivot pin (not shown) may be inserted through openings in the actuating members 54 to functionally couple the actuating members 54 to one another at the actuating joint 56.

The cable 52 may be coupled to the pivot pin, such that forces acting on the cable 52 will also operate on the pin. The cable 52 is wrapped around, or otherwise operationally coupled to, the pulley 50, such that upon activation of the pulley 50, the cable 52 is pulled, which in turn displaces the pin.

Figure 7:
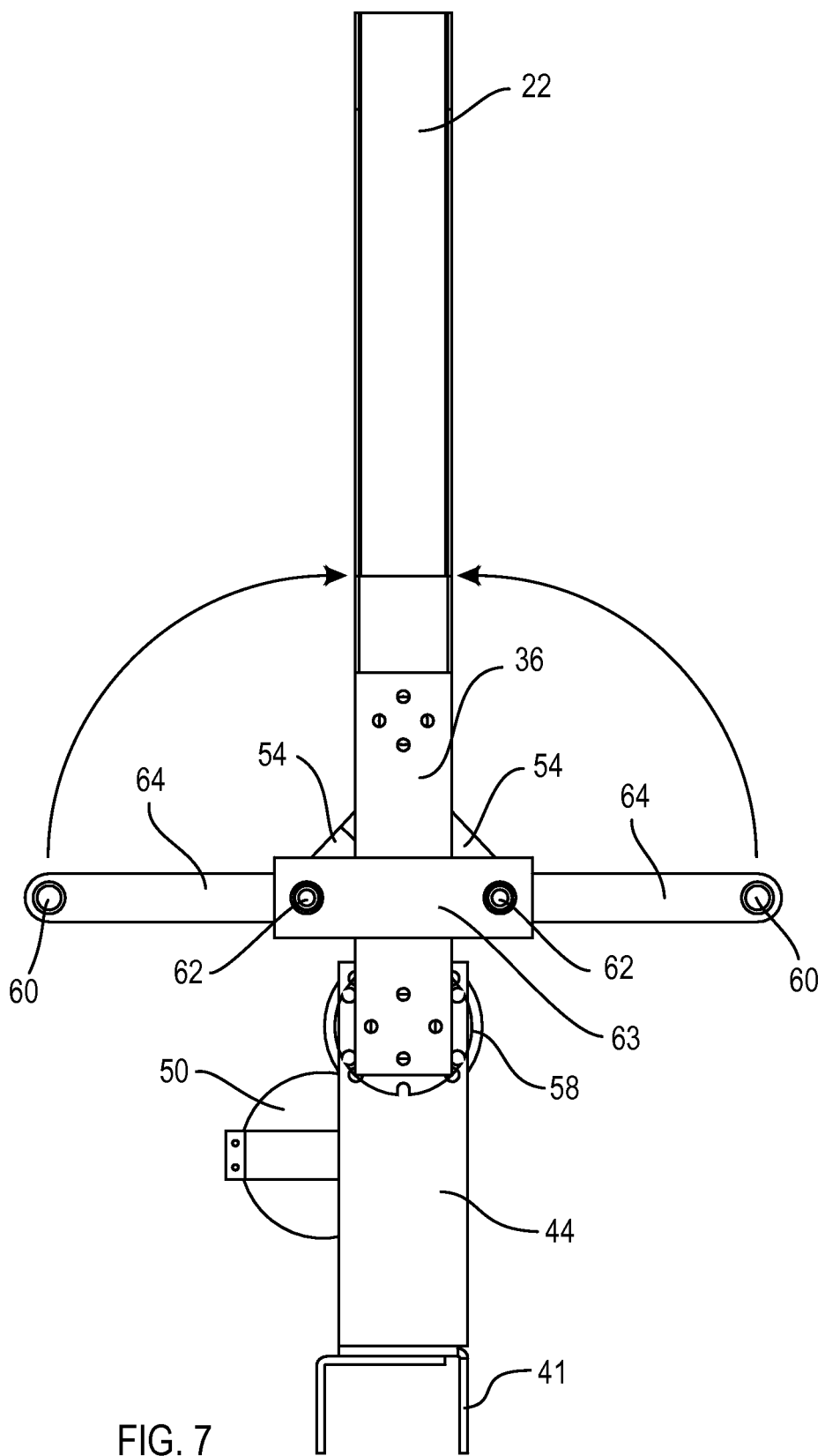
FIG. 7 is a top view of the measuring device in accordance with the present disclosure.

Each of the actuating members 54 may be configured to couple to, or otherwise engage, the respective pivot bars 62 and may be configured to couple to, or otherwise engage, the respective positioning members 60, as depicted. The actuating members 54 may be configured in a shape that is conducive to translating linear actuation of the cable 52 into an arc-shape displacement of the positioning members 60. Specifically, the actuating members 54 may be configured such that under the condition that the pulley 50 operates to pull the cable 52 toward the pulley 50, the actuating members 54 are pulled in the direction of travel of the cable 52. By so doing, the linear movement of the actuating members 54 may cause the pivot bars 62, to which the actuating members 54 are coupled, to respectively rotate about their axis between plates 63. Rotation of the pivot bars 62 results in the rotation of the arms 64 about the pivot bars 62, because by being coupled to the pivot bars 62 at one end thereof the arms 64 pivot about and follow the rotational motion of the pivot bars 62. The displacement of the arms 64 likewise results in the displacement of the positioning members 60, the positioning members 60 being coupled between arms 64. Thus, under the condition that the cable 52 is pulled toward the pulley 50, the configuration of the actuating members 54, the pivot bars 62, the arms 64, and the positioning members 60, results in each of the positioning members 60 being displaced in an arc-like motion toward one another, as depicted by the arrows in FIG. 7. Similarly, under the condition that the pulley 50 operates to let out the cable 52 from the pulley 50, the actuating members 54 are allowed to retreat to their initial state. By so doing, positioning members 60 are permitted to swing back to their initial state, as depicted in FIG. 7. The positioning members 60 may be biased toward the open position, as depicted in FIGS. 1-3 and 7. The biasing may be accomplished by a spring or other biasing member that forces the positioning members 60 into the open position in the absence of operational force applied by the user, whether automated or manual. This pattern of operation may be repeated as often as necessary or as often as desired.

Figure 4:
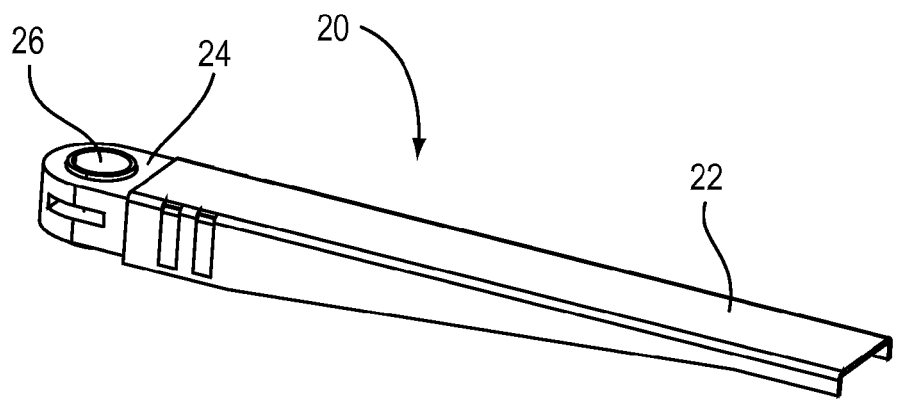
FIG. 4 is a right-side perspective view of the measuring device in accordance with the present disclosure.
Figure 5:
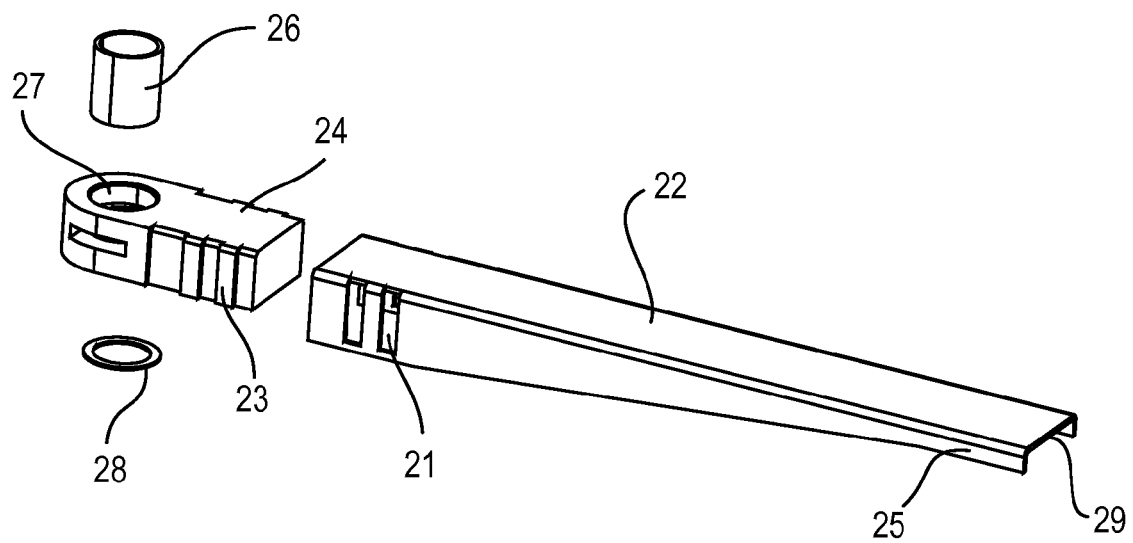
FIG. 5 is a perspective view of a component of the measuring device in accordance with the present disclosure.

With reference again to the Figures, FIGS. 4 and 5 depict an embodiment of the blade 20. The blade 20 may comprise a body portion 22 and a grommet 24. The body portion 22 may further comprise a slot 21 in the sidewall thereof, a narrow side wall portion 25 and a distal end 29. Embodiments of the device 2 further comprise the body 22 of the blades 20 being made of aluminum or other weather and wear resistant material. The grommet 24 may comprise protrusions 23 in the side thereof and bore 27 running from a top face of the grommet 24 to a bottom face. The body portion 22 may be configured to functionally engage the grommet 24. The body 22 may be configured to be placed over the grommet 24 such that the slots 21 in the side wall of the body 22 engage the protrusions 23 in the sidewall of the grommet 24. In this way, the body 22 can be functionally, yet releasably and repeatedly, coupled to the grommet 24. The grommet 24 may be made or manufactured of flexible or malleable material, such as, for example, rubber. Rubber and rubber-like materials permit the grommet 24 to provide the rigidity necessary to support the body 22 while at the same time providing give and flexibility to the overall blade 20, as needed. For example, the grommet 24 may be rigid enough to hold and maintain a body 22 of the blade 20 in an orthogonally oriented position with respect to the blade support member 32, and yet supple enough to allow the blade 20 to flex in horizontal and vertical directions in response to impact, applied force, or other external conditions and factors. This flexing in horizontal and vertical directions is in addition to the rotation of the grommet 24 about the blade support member 32. This flexing lessens the impact of the user's hand against the body 22 of the blade 20, or, better yet, lessens the impact of the blade 20 on the user's hand upon impact. Yet, the blade 20 does not deflect so much upon impact that it negatively affects the overall purpose of device 2—to accurately measure the user's vertical leap. In other words, although the blade 20 is configured to deflect, or otherwise flex, in response to impact from the user to lessen the blow to the user's hand, the blade 20 does not deflect so much as to cause other neighboring blades 20 to move, or rotate, that should not move or rotate. In addition, the grommet 24 may be UV treated to withstand sun exposure, in the event the device 2 is utilized outdoors.

Embodiments of the blade 20 further comprise the bore 27 being configured to receive and house therein a friction reducing member 26, as depicted in FIG. 4. The friction reducing member 26 may be configured to be shaped like a hollow cylinder or a tube. The friction reducing member 26 may also be configured to be placed in the bore 27 to prevent the bore 27, and thus the grommet 24, from contacting the blade support member 32. The friction reducing member 26 thus permits the blade 20 to rotate or spin more efficiently about the blade support member 32 than it might otherwise. Indeed, if the friction reducing member 26 were not in place, the grommet 24, made of rubber-like material, may not effectively rotate or spin about the blade support member 32. Embodiments of the blade 20 further comprise a spacer 28 being positioned on the blade support member 32 between neighboring blades 20, or more particularly between the respective grommets 24 of neighboring blades 20. Similarly to the friction reducing member 26, the spacer 28 prevents the occurrence of friction that might be caused by neighboring grommets 24 being rubbed against one another during operation of the device 2. Thus, the spacer 28 prevents undesired friction between neighboring blades 20 on the blade support member 32.

Figure 6:
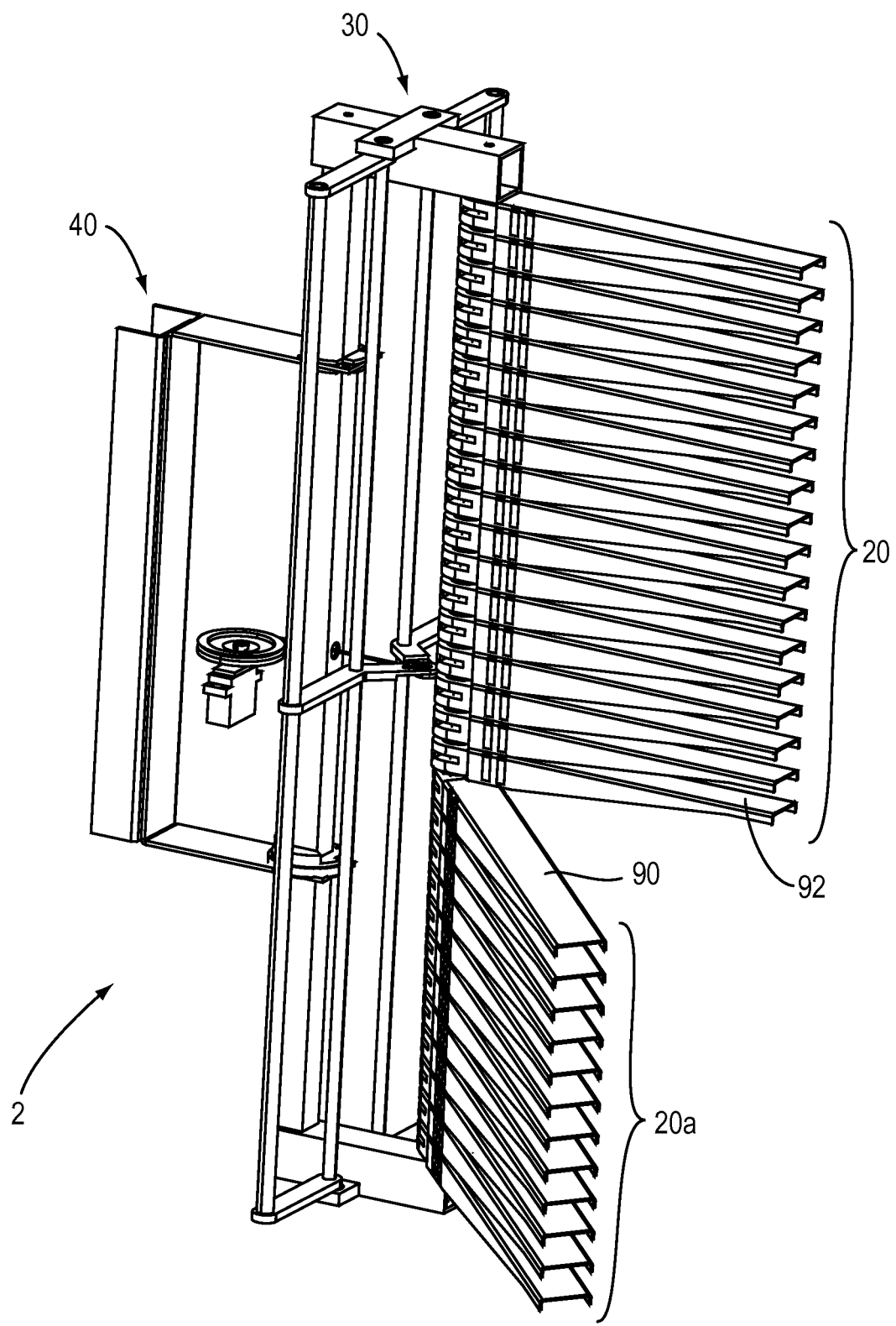
FIG. 6 is an exploded perspective view of the component of the measuring device of FIG. 5 in accordance with the present disclosure.

As depicted in at least FIGS. 1 and 6, a plurality of blades 20 may be placed on the blade support member 32. To do so, the blade 20, having the friction reducing member 26 placed in the bore 27 of the grommet 24 and the body 22 coupled to the grommet 24 by way of the interface between the slots 21 and the protrusions 23, may be coupled to the blade support member 32 by inserting the blade support member 32 into the bore 27 of the grommet 24. Thereafter, the blade support member 32 supports the blade 20 thereon. Further, the interface between the blade 20 and the blade support member 32 provides that the blade 20 may rotate about the blade support member 32, as depicted in FIG. 6, upon application of force to the sidewall of each respective blade support member 32 by the user during the user's vertical jump. FIG. 1 depicts an initial orientation of the blades 20 with respect to one another prior to the user displacing the blades 20. FIG. 6, on the other hand, depicts the orientation of blades 20 and 20a, blades 20 being those blades that the user did not displace and blades 20a being those blades that the user successfully displaced during his/her vertical jump. Blade 92 depicts the lowest blade 20 that the user failed to displace. Blade 90 depicts the highest blade 20 that the user was able to displace.

Embodiments of the device 2 further comprise the blades 20 being replaceable if and when they become damaged, used, or worn. For example, if a body 22 of a blade 20 becomes damaged, it may be detached from its respective grommet 24 and replaced. On the other hand, if a grommet 24 becomes worn or damaged, that damaged grommet 24 may be removed from the blade support member 32. Thereafter, a new blade 20 may replace the damaged blade 20, by sliding the remaining blades 20 down the blade support member 32 until a space for a new blade 20 remains at the top of the blade support member 32. The blade support member 32 will need to be detached from the frame support 30. Then, the new blade 20 may be slid onto the blade support member 32 by placing the blade support member 32 within the bore 27 of the grommet 24 of the new blade 20. In addition, any damaged grommet 24 may be replaced with a new grommet 24 without also having to replace the body 22 of the respective blade 20. In this way, individual damaged parts of the blade 20 may be replaced without having to replace the entire blade 20.

Embodiments of the blade 20 further comprise the narrow side wall 25 near the distal end 29 of the body 22. The narrow side wall 25 may be configured to be ⅜ the size of the sidewall of the blade 22, the sidewall of the blade being approximately one inch in height. Moreover, the ⅜ inch sidewall 25 projects downward from the top surface of the body 22 of the blade 20. In this way, the narrow side wall 25 provides that a gap 18 is established between distal ends 29 of neighboring blades 20 on the support member 32, as depicted in FIG. 3. With each of the blades 20 representing a measurement of one inch, it is important that a user only be able to displace the respective blades 20 that the user is able to reach and displace during his/her jump. If this were not the case, then the utility of the device 2 might be compromised. In other words, the blades 20 should only displace about the blade support member 32 by the force that is applied by the user during the jump and not by the rotational force of neighboring blades 20. Thus, by establishing the gap 18 between neighboring blades 20, only those blades 20a that are operated by the user will rotate about the blade support member 32. Neighboring blades 20 do not contact one another and will not move.

Moreover, for a more accurate measurement, to displace any one single blade 20 and get credit for having reached that corresponding height, the user must achieve at least ⅝ of that height. This is due to the fact that the side wall 25 only extends ⅜ of an inch down from the next highest blade 20. Thus, to get credit for each additional inch, the user must achieve at least ⅝ of that inch. Or, in other words, the user must contact and displace the ⅜ inch side wall 25, which is ⅝ of an inch above the next lowest blade 20.

Figure 8:
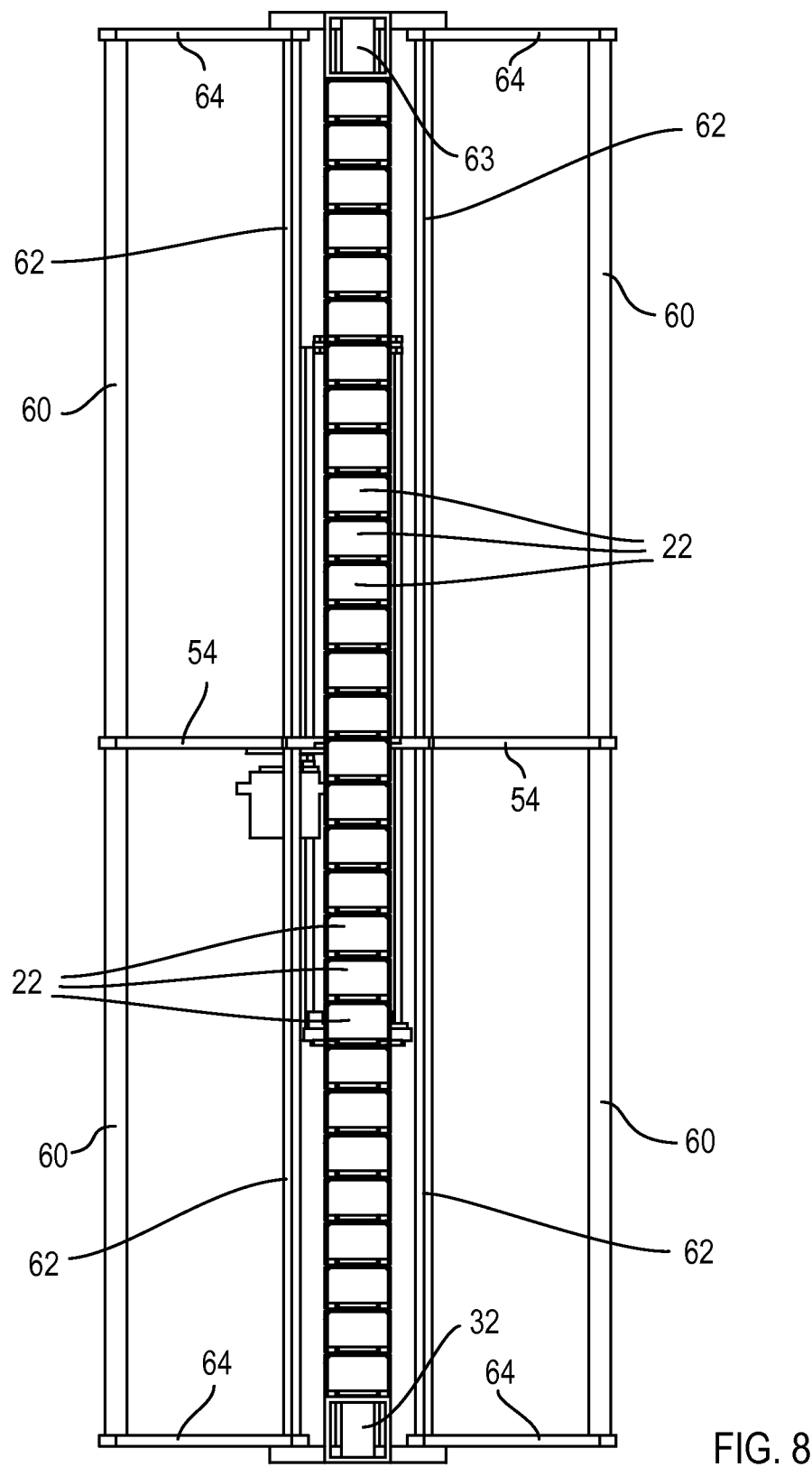
FIG. 8 is a front view of the measuring device in accordance with the present disclosure.

In view of the above, to operate the device 2 to measure a user's vertical leap, the user must first align the blades 20 in an initial state, as shown in FIG. 1. Each of the plurality of blades 20 is aligned vertically, as depicted in FIG. 8. Thereafter, a user reaches into the air with one hand to measure his/her standing reach from the floor. After this measurement is taken, the user leaps into the air from a standing position and attempts to displace the highest blade 20 possible. Once the reachable, displaced blades 20a are displaced by the user during the jump, the measurement is taken between the floor and the highest displaced blade 20a. Then the difference between the two measurements is calculated. This value is the user's vertical leap measurement. Prior to the next user operating the device to measure his/her vertical leap, the device 2 may be operated to activate the pulley 50, which pulls the cable 52 which operates the actuating members 54, which operates the arc-like movement of the positioning members 60 toward one another, as described herein. As the positioning members 60 move toward one another, the positioning members 60 contact any displaced blades 20a and transition them back to their initial state. Thus, the positioning members 60 effectively pinch together until each of the blades 20 is pinched therebetween to return the displaced blades 20a back to their initial alignment, wherein all the blades 20 are vertically aligned and ready to be used by the next user, as depicted in FIG. 8. Embodiments of the device 2 further comprise the positioning members 60 having cushion members (not shown) coupled thereto, such that as the positioning members 60 pinch together to contact the blades 20 the cushion members actually contact the blades 20 to prevent damage to the positioning members 60 and the blades 20.

Figure 9:
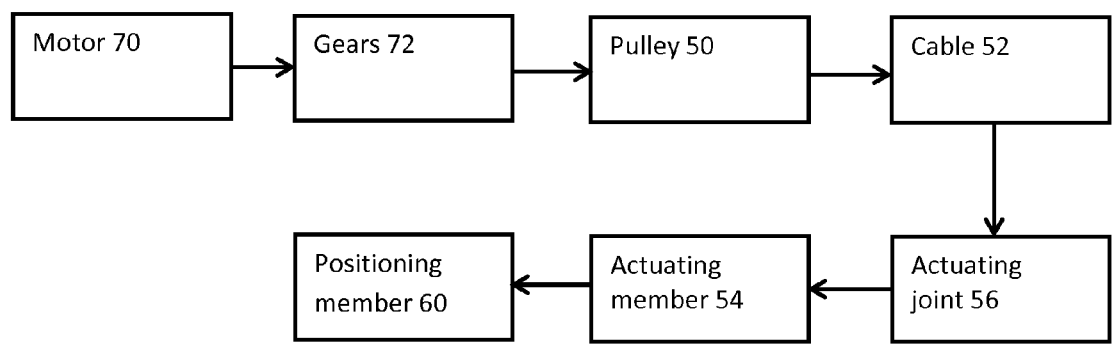
FIG. 9 is a schematic view of components of the measuring device in accordance with the present disclosure, the operation of said components facilitating a rotational movement of the measuring device in accordance with the present disclosure.
Figure 10:
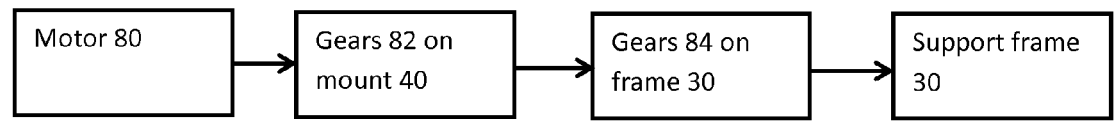
FIG. 10 is a schematic view of components of the measuring device in accordance with the present disclosure, the operation of said components facilitating a rotational movement of the measuring device in accordance with the present disclosure.

Referring to FIGS. 9 and 10, the device 2 may be operated by manual power or by automated, motor-driven power. FIG. 9 schematically depicts the operation of the positioning members 60 via a motor 70. The motor 70 drives gears 72 that in turn drive the pulley 50. The pulley 50 then operates the cable 52 to pull or let out the cable 52, as the case may be. The cable 52 operates the linear motion of the actuating members 54 via the actuating joint 56. The actuating members functionally operate the arc-like pivot of the positioning members 60 toward one another. The motor 70 can be operated by batteries or by low-voltage AC power provided by an outlet or other electrical connection. In addition, the motor 70 can be operated or powered by solar cells coupled to the device 2, such that the motor 70 can operate by solar power. The activation of the motor 70 may be through remote activation, such as by utilization of an RC circuit. For example, a transmitter held by the user may be configured to send one or more signals to a receiver on the device 2, the receiver being configured to receive the signal, process the signal, and instruct the servos to operate. The motor 70 may thus be remotely activated and operated. Alternatively, embodiments of the device 2 include the pulley 50 being operated by manual power. For example, a user may tug, or otherwise pull, on the cable 52 (which may be a rope or string) that operates the linear motion of the actuating members 54 via the actuating joint 56. As described above, the actuating members 54 functionally operate the arc-like pivot of the positioning members 60 toward one another. Thus, the operation of the positioning members 60 may be accomplished by automated means or by manual means.

FIG. 10 schematically depicts the operation of the support frame 30 with respect to the mount 40. Specifically, a motor 80 may be activated and operated to operate gears 82 that are configured on the mount 40. The gears 82 may then operate to drive corresponding gears 84 on the frame 30, which gears 84 cause the frame 30 to rotate with respect to the mount 40. The motor 80 can be operated by batteries or by low-voltage AC power provided by an outlet or other electrical connection. In addition, the motor 80 can be operated or powered by solar cells coupled to the device 2, such that the motor 80 can operate by solar power. The activation of the motor 80 may be through remote activation, such as by utilization of an RC circuit. For example, a transmitter held by the user may be configured to send one or more signals to a receiver on the device 2, the receiver being configured to receive the signal, process the signal, and instruct the servos to operate. The motor 80 may thus be remotely activated and operated. Alternatively, embodiments of the device 2 include the frame 30 being manually adjusted by the user under manual power. Operation and release of the locking pins 57 may be accomplished by lifting the locking pins 57 out of the holes 59 and rotating the frame 30 with respect to the mount 40 until the desired position is achieved.

Embodiments of the device 2 further comprise the flexible properties of the grommet 24 being beneficial during operation of the automated reset features herein described. For example, if for some reason the blades 20 where to bind up on a neighboring blade 20 during automated reset of the blades 20, the gears and the motor may be damaged if the grommet 24 of the blade 20 did not provide for some give and flexibility. To this end, the motors 70 and 80 may be configured with a force-triggering mechanism that shuts down operation of the motors 70 and 80 should a predetermined maximum operational force be encountered by the motors 70 and 80 or gears 72, 82, or 84. In addition to the above, some flexibility in the blades 20 also serves to lessen the impact against the user's hand upon the user smacking the blades 20 during the height of the user's jump. In addition, while jumping and contacting the blades 20, a user may inadvertently grab, or otherwise snag, the blades 20 and as a consequence pull down on the blades 20 as the user falls back to the ground. Because the blades 20 are flexible, due to the grommet 24 being flexible, instead of the blades 20 fracturing or breaking due to the downward force exerted by the user, the blades 20 flex, bend and resist breaking. Consequently, the configuration of the blades 20 and the resulting flexibility increases the longevity and durability of the blades 20.

Referring now to FIGS. 11 and 12, embodiments of a vertical leap measuring device 2 include a vertical pole 112, the pole 112 being, for example, about 3 to 4 inches in diameter and 13 feet in height. The pole 112 may be designed to stay in one location either exterior or interior to an edifice, or building, meaning the device 2 may be used indoors or outdoors, and the pole 112 should be stabilized at a vertical plumb position and secured to a ground surface or other surface, such that the pole 112 is stabilized with respect to the surface upon which the pole 112 is mounted and does not move when the device 2 is operated by a user. Embodiments of the device 2 include the pole 112 being embedded in concrete, which thus stabilizes the pole 112. Specifically, the pole 112 may be 13 feet from grade or finish floor in height and embedded 24" inches below grade or finish floor with 12 inches of concrete securing the pole 112. Additional embodiments of the device 2 include the pole 112 being secured to a moveable support structure (not shown), such that the device 2 is portable, yet stable when in use. Embodiments of the device 2 include the pole 112 being made of galvanized steel 3 to 4 inches in diameter and ¼ inch in thickness.

The pole 112 may further include a vertical measuring blade configuration 114 that includes blades 115, the blades 115 being configured to displace horizontally in reaction to force applied to the blades 115. Specifically, the blades 115 may be configured to spin, or rotate, about the blade configuration 114, the blade configuration 114 being coupled to the pole 112. The blades 115 may be configured to spin, or rotate, approximately 360 degrees about the blade configuration 114. The blades 115 may be configured with the same or similar structure of blades 20 described herein. Thus, blades 115 may be coupled to the blade configuration 114 in much the same way the blades 20 are coupled to the blade support member 32.

Embodiments of the device 2 may include a reset bar 116 that may be connected to the pole 112 with two sleeves 117. The sleeves 117 may be configured to interface with the pole 112 to allow the reset bar 116 to pivot, spin, or rotate about the pole 112. For example, but not by way of limitation, the sleeves 117 may be configured to be supported by a top and bottom flat washer, the flat washers being spot welded to the pole 112. Such a configuration, maintains the sleeves 117 in their respective axial position with respect to the pole 112, but allows the sleeves 117 to spin radially about the pole 112, which thus allows the reset bar 116 to spin radially about the pole 112. The reset bar 116 may pivot, or rotate, about 180 degrees about the pole 112. In other embodiments, the reset bar 116 may pivot 360 degrees about the pole 112. The reset bar 116 may be configured to interface with the blades 115 to reposition the blades 115 as needed. The blades 115 may be configured to rotate between several positions. For example, but not by way of limitation, the blades 115 may have a first position, wherein each of the blades 115 is substantially aligned with one another, as shown in FIG. 11, and the blades 115 may have a second position, wherein each of the blades 115 is not substantially aligned with one another, as shown in FIG. 12, due to a user jumping up and contacting the blades 115 to displace the blades from the first position to the second position. The reset bar 116 may be utilized to reset the blades 115 from the second position, or any other position for that matter, back to the first position. In this way, the blades 115 can easily and efficiently be reset to the first position between successive uses. This increases the efficiency of the device 2.

Embodiments of the device 2 may include a stop bar 120, the stop bar 120 being utilized to replace the blades 115 back into the first position, ready to be used by the user or a subsequent user. The stop bar 120 may be fixed to the blade configuration 114 and may work in conjunction with the reset bar 116. For example, the blades 115 may be pressed up against the stop bar 120 to establish a first position of the blades 115. Thereafter, a user may impact the blades by jumping and contacting as many blades 115 as possible with the user's hand. The reset bar 116 may then be used to pivot about the pole 112 to contact the displaced blades 115 to push the blades 115 back up against the stop bar 120 to reset the blades 115 to the initial position, ready to be used by the user or a next user.

Embodiments of the device 2 may include a measurement grid 118 being displayed on the pole 112. For example, the measurement grid 118 may be etched or marked on the pole 112. The grid 118 may be a measurement of inches off the ground surface from which the user will jump, or elevate, to measure the user's vertical leap. Other units of measure may be incorporated. The grid 118 may measure from 0 to 150 inches, or more, if necessary. By displaying the grid 118 on the pole 112, the user may measure his/her standing reach by reaching one hand high above his/her head and measuring the height of his/her reach. Then, the user may jump off the ground and contact as many blades 115 as possible to displace as many of the blades 115 from their respective first position. The height of the highest displaced blade 120 may then be measured according to the grid 118 on the pole 112. The distance between the user's measured standing reach and the measured height of the highest displaced blade 120 is the user's measured vertical leap. Thus, the device 2 will allow a person to measure their reach and overall vertical jump measurement.

This vertical leap measuring device 2 would be ideal for public parks, high schools, middle schools, colleges and professional sports facilities. This is one of the skills determined by the NFL combine, as well as the NBA and professional volleyball.

Referring now to FIG. 13, upon the condition that the device 2 is mounted to a support structure 10, such as a basketball backboard 12, the device may be configured to transition between a stored position and an operable position. In the stored position, the support frame 30 may be rotated with respect to the mount 40, such that the blades 20 are projecting away from the back face of the basketball backboard 12 and are far away from the area of play. On the other hand, when the device 2 is needed, the device 2 may be transitioned from the stored position to an operable position by rotating the support frame 30 with respect to the mount 40 to position the blades 20 such that the blades 20 are projecting away from the side face of the basketball backboard 12 or are projecting away from the front face of the basketball backboard 12, as determined and desired by the user for ease of use.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A vertical leap measuring device for measuring a vertical leap of a user, the device comprising:
   a mount;
   a support frame coupled to the mount;
   a vertical support member, the vertical support member being supported by the support frame;
   a plurality of blades functionally coupled to the vertical support member, wherein each blade moves with respect to the vertical support member from an initial position in response to a force applied thereto by the user; and
   positioning members coupled to the support frame each positioning member pivotable about an axis to engage the plurality of blades,
   wherein the positioning members move toward each other by pivoting about its respective axis, wherein each positioning member contacts the blades at the same time to pinch the blades therebetween to reset each of the blades to the initial position.

2. The device of claim 1, wherein the mount is coupled to a structure.

3. The device of claim 1, wherein the positioning members pivot in response to an electric signal.

4. The device of claim 1, wherein the positioning members pivot in response to user input.

5. The device of claim 2, wherein the mount is configured to be repeatedly and releasably coupled to the structure.

6. The device of claim 2, wherein the structure is a pole, the pole being anchored in the ground and oriented substantially vertically.

7. The device of claim 2, wherein the structure is a basketball backboard.

8. A vertical leap measuring device for measuring a vertical leap of a user, the device comprising:
   a support frame;
   a vertical support member, the vertical support member being supported by the support frame;
   a plurality of blades functionally coupled to the vertical support member, wherein each blade moves about the vertical support member from an initial position in response to a force applied thereto by the user; and
   a means for resetting the plurality of blades to the initial position, the means for resetting being coupled to the device, wherein the means for resetting comprise positioning members coupled to the support frame each positioning member pivotable about an axis to engage the plurality of blades, and the positioning members move toward each other by pivoting about its respective axis, wherein each positioning member contacts the blades at the same time to pinch the blades therebetween to reset each of the blades to the initial position;
   wherein each blade further comprises a grommet and a body, wherein the grommet is configured to functionally engage the vertical support member and the body is configured to repeatedly and releasably couple to the grommet, the body extending from the grommet and being oriented substantially orthogonally with respect to the vertical support member, the body being configured to be contacted by the force applied by the user.

9. The device of claim 8, wherein the device further comprises a friction reducing member positioned between the vertical support member and the grommet, the friction reducing member being configured to rotatably engage the vertical support member.

10. The device of claim 8, the device further comprising a spacer positioned on the vertical support member between neighboring blades and configured to slidably engage the vertical support member.

11. The device of claim 8, wherein the grommet is malleable such that under the condition that force is applied to the body, the blade flexes in a horizontal or a vertical direction, in addition to pivoting about the vertical support member.

12. The device of claim 11, wherein the grommet is rubber and the body is aluminum.

13. A vertical leap measuring device for measuring a vertical leap of a user, the device comprising:
   a mount;
   a support frame coupled to the mount;
   a vertical support member, the vertical support member being supported by the support frame;
   a plurality of blades functionally coupled to the vertical support member, wherein each blade moves about the vertical support member from an initial position in response to a force applied thereto by the user; and
   a means for resetting the plurality of blades to the initial position, the means for resetting being coupled to the device, wherein the means for resetting comprise positioning members coupled to the support frame each positioning member pivotable about an axis to engage the plurality of blades, and the positioning members move toward each other by pivoting about its respective axis, wherein each positioning member contacts the blades at the same time to pinch the blades therebetween to reset each of the blades to the initial position;
   wherein the support frame is configured to rotate with respect to the mount between a stored position and an operable position.

14. The device of claim 13, wherein the mount is a pole, the pole being anchored in the ground and oriented substantially vertically.

15. The device of claim 13, wherein the mount is configured to be repeatedly and releasably coupled to a basketball backboard, and wherein in the stored position the blades are directed away from a back face of the backboard and in the operable position the blades are directed away from one of a side of the backboard and a front face of the backboard.

16. The device of claim 13, wherein the mount is configured to be repeatedly and releasably coupled to a structure, and wherein the support frame is configured to slidably engage the mount.

17. The device of claim 13, wherein the support frame rotates with respect to the mount in response to an electric signal.

18. The device of claim 14, the positioning member further comprising:
- a reset bar functionally coupled to the pole and configured to rotate about the pole and engage the plurality of blades; and
- a stop bar functionally coupled to the support frame, the stop bar being configured to engage the reset bar with the blades therebetween,
- wherein the reset bar and the support frame are configured to slidably engage the pole such that the reset bar and the support frame releasably couple to the pole at heights determined by the user, and
- wherein the pole further comprises a measurement grid thereon.

* * * * *